Oct. 4, 1932.    G. M. KRAG    1,880,205
BROILING APPARATUS
Filed May 17, 1930    2 Sheets-Sheet 1

INVENTOR:
Grace Mann Krag
By E. J. Andrews
Atty.

Oct. 4, 1932.   G. M. KRAG   1,880,205
BROILING APPARATUS
Filed May 17, 1930   2 Sheets-Sheet 2
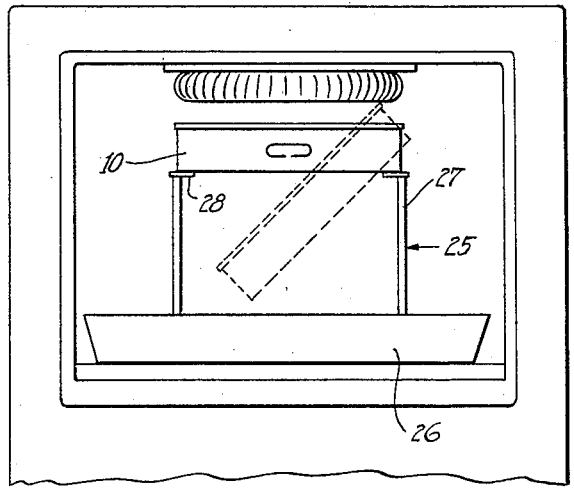
Fig. 6
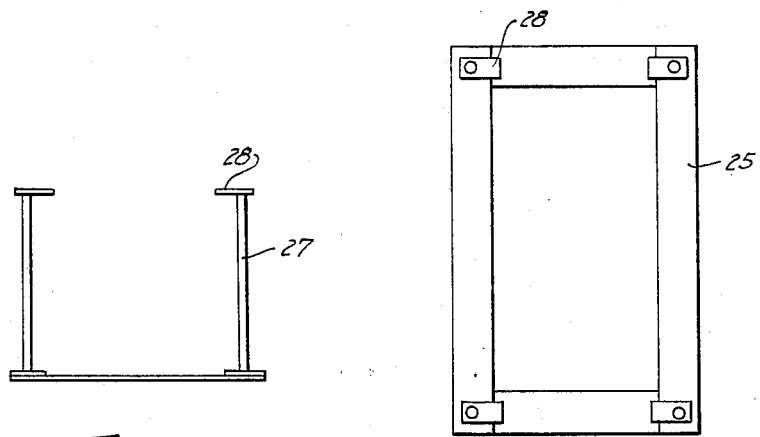
Fig. 7
Fig. 8
INVENTOR:
Grace Mann Krag
By E J Andrews
Atty.

Patented Oct. 4, 1932

1,880,205

UNITED STATES PATENT OFFICE

GRACE MANN KRAG, OF CHICAGO, ILLINOIS

BROILING APPARATUS

Application filed May 17, 1930. Serial No. 453,123.

This invention relates to broiling apparatus, and has for its object providing suitable grill means for holding meat which is to be broiled and to devices for manipulating the apparatus and for supporting it when not in use.

Figure 1:
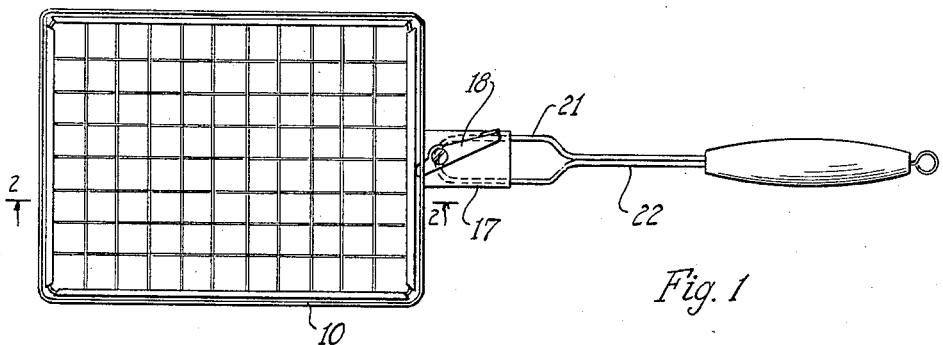
Figure 2:
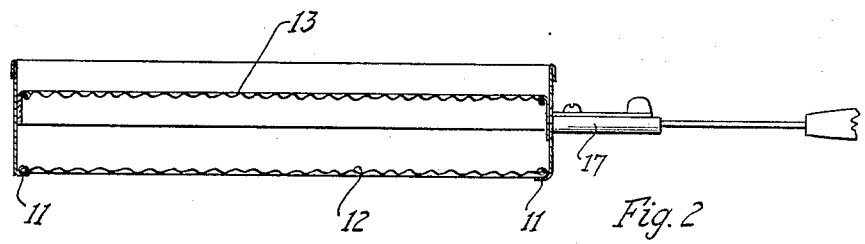
Figure 3:
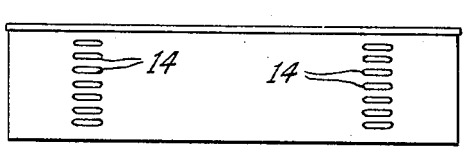
Figure 4:
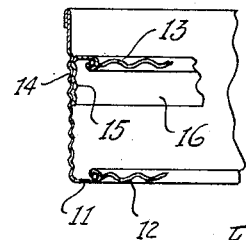
Figure 5:
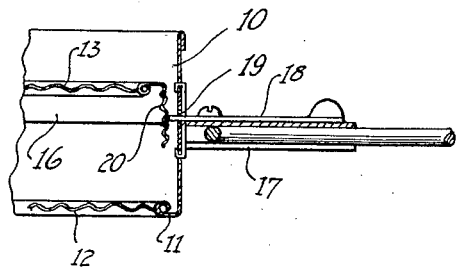

Of the accompanying drawings, Fig. 1 is a plan view of a meat holder which embodies the features of my invention; Fig. 2 is a longitudinal sectional elevation along the line 2—2 of Fig. 1; Fig. 3 is a rear end view of the holder; Fig. 4 is an enlarged detail view of the rear portion of Fig. 2; Fig. 5 is an enlarged detail section of the front of Fig. 2; Fig. 6 is an elevation of the holder when mounted in an oven in operative position; Fig. 7 is an end view of the support for supporting the holder; and Fig. 8 is a plan view of the support.

The broiling apparatus which I have illustrated comprises a rectangular frame 10 which has sides consisting of sheets of metal having flanges 11 on the lower edges for supporting the grill 12, which is of suitable mesh for properly supporting and broiling the meat. In the side walls of the frame are formed means for supporting a second grill 13 in an adjusted position. The means which I prefer for supporting the grill 13 comprises corrugations 14 in the rear end of the frame, which are adapted to coact with corrugations 15 in a plate fixed to the frame 16 of the grill 13. In the front end of the frame 10 is a fixed handle socket 17 and, on this socket, is pivoted a latch 18 which, passing through an opening 19 in the frame 10, is made to coact with the corrugations 20 in a plate also fixed to the frame 16. When this latch 18 is rotated to the position indicated in Fig. 5, the upper grill will be held firmly in place in the frame 10 and, by suitable adjustment, the two grills can be adapted to any thickness of meat. Obviously, the upper grill can be inverted so as to be brought closer to the lower grill if desired.

One of the objects of my invention is to provide suitable handle means which can be very quickly and conveniently applied to or removed from the holder frame. This means comprises the socket 17 in which the plug end 21 of the handle 22 can be inserted for the purpose of manipulating the grill holder when desired.

In order to suitably support the apparatus when in use, I provide a frame work 25 which is adapted to rest on the bottom of the oven, ordinarily in the oven pan 26, and each of the upwardly projecting legs 27 supports a flange 28 upon which the frame 10 rests when in use. When it is desired to invert the grill holder so as to broil the other side of the meat, it is necessary only to shift the frame sidewise, as indicated in Fig. 6 by dotted lines, and invert it, the handle 22 being used for that purpose.

I claim as my invention:

1. Broiling apparatus comprising an enclosing frame, a grill plate supported in the frame, a second grill plate mounted in the frame above the first plate, means for supporting the second grill plate in adjusted positions in said frame, said supporting means comprising a series of corrugations formed in one end of said frame, and a corresponding series of corrugations formed in one end of said second grill plate and adapted to coact in adjusted positions with said first series of corrugations.

2. Broiling apparatus as claimed in claim 1, including a third series of corrugations in the other end of said second grill plate, and means associated with said frame for coacting with the third series of corrugations.

3. Broiling apparatus comprising an enclosing frame, a grill plate supported in the frame, a second grill plate mounted in the frame above the first plate, means for supporting the second grill plate in adjusted positions in said frame, said supporting means comprising a cam member pivotally mounted on said frame and adapted when rotated to press inwardly against said second grill plate, and a series of corrugations in said second grill plate adapted to coact with said cam member.

In testimony whereof, I hereunto set my hand.

GRACE MANN KRAG.